United States Patent [19]

Matsuda

[11] Patent Number: 4,502,056
[45] Date of Patent: Feb. 26, 1985

[54] TEMPERATURE CONTROL SYSTEM

[75] Inventor: Yasuhiko Matsuda, Hanamaki, Japan

[73] Assignee: Kabushiki Kaisha Sato, Japan

[21] Appl. No.: 487,256

[22] Filed: Apr. 21, 1983

[30] Foreign Application Priority Data

Apr. 30, 1982 [JP] Japan ................................. 57-71535

[51] Int. Cl.³ ........................................... G01D 15/16
[52] U.S. Cl. ............................... 346/76 PH; 219/216; 400/120
[58] Field of Search ............ 346/76 PH; 219/216 PH; 400/120

[56] References Cited

U.S. PATENT DOCUMENTS

| | | | |
|---|---|---|---|
| 4,262,188 | 4/1981 | Beach | 219/216 PH |
| 4,324,486 | 4/1982 | Nishikawa | 219/216 PH |

FOREIGN PATENT DOCUMENTS

| | | | |
|---|---|---|---|
| 30846 | 3/1979 | Japan | 400/120 |
| 27370 | 3/1981 | Japan | 400/120 |
| 130379 | 10/1981 | Japan | 400/120 |
| 156278 | 9/1982 | Japan | 400/120 |
| 165276 | 10/1982 | Japan | 400/120 |
| 205179 | 12/1982 | Japan | 400/120 |

Primary Examiner—E. A. Goldberg
Assistant Examiner—A. Evans
Attorney, Agent, or Firm—Ostrolenk, Faber, Gerb & Soffen

[57] ABSTRACT

This invention provides a temperature control system for a thermal printer which prints by urging a printing plate with type formed thereon against a heat-transfer paper sheet. The system raises the temperature of the printing plate rapidly after power is turned on and then maintains the temperature of the printing plate essentially constant at the optimal temperature, so that clear printing may be performed at any time. In the initial heating period of the printing plate, a high voltage is applied to the printing plate to raise the temperature quickly. When a first sensor detects that the printing plate has reached a temperature close to the optimal printing temperature, the high voltage supply is interrupted. Thereafter, a second sensor and a control circuit connected thereto serve to produce a low voltage that is applied so as to maintain the printing plate at the optimal printing temperature. The magnitude of the low voltage is inversely proportional to printing plate temperature.

4 Claims, 2 Drawing Figures

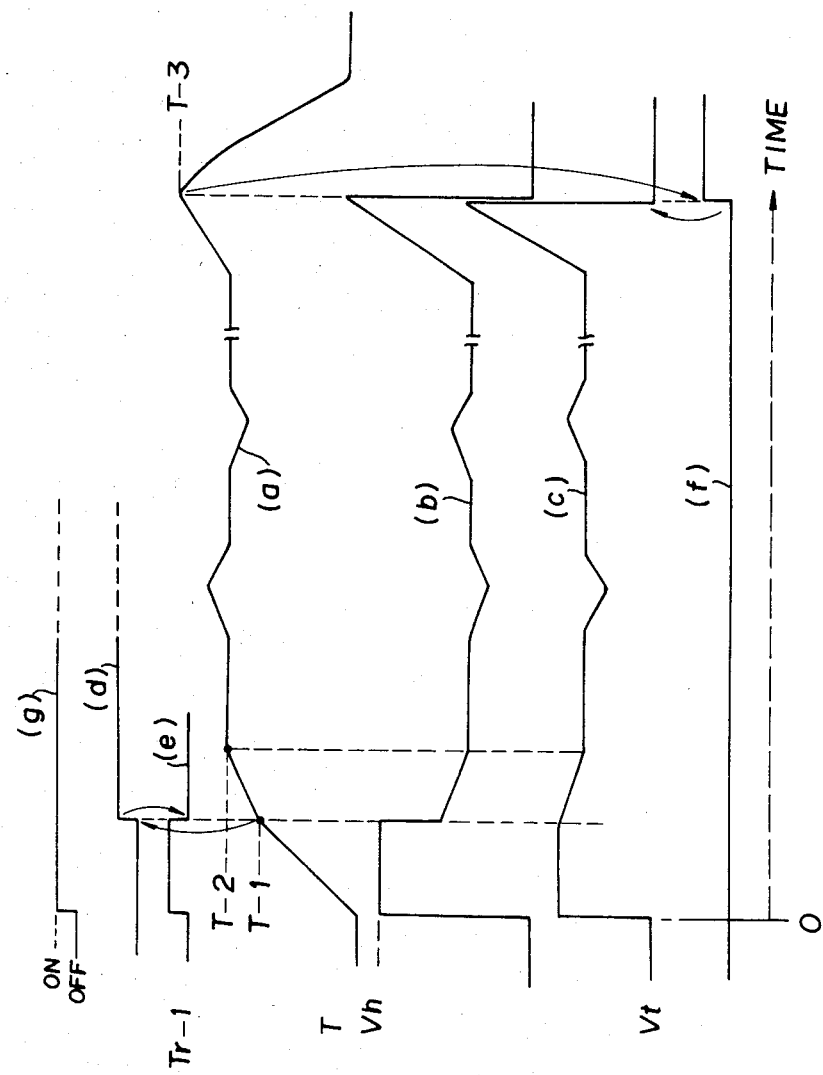

TEMPERATURE CONTROL SYSTEM

BACKGROUND OF THE INVENTION

This invention relates to a temperature control system for a thermal printer which prints on heat-transfer paper of the like using a printing plate with type. More particularly, this invention relates to a temperature control system which allows a rapid initial temperature rise of the printing plate, and which maintains the printing plate at a constant temperature after such a rapid temperature rise so that clear printing may be performed at any time.

Recently there has been increased usage of thermal printers for labeling various goods. One type of thermal printer is used to print prices, manufacturing dates and/or bar codes or the like on labels sequentially adhered on a tape-like base sheet and preprinted with additional information such as store names and addresses. Another type of prior art thermal printer is provided in a printing plate with a heater and type for printing store names, addresses or the like. The latter thermal printer may also print price and date information or may be disposed next to a thermal head that prints price and date information.

Unlike a thermal head having a number of small printing elements, the printing plate of a thermal printer of the type described above has a large surface area to be heated. Therefore, when a low voltage is applied to the heater, it takes a considerable period of time before the temperature of the printing surface is raised to a minimum temperature to obtain satisfactory printing. Thus, printing cannot be started immediately. Conversely, when a high voltage is applied to the heater, the time required to start printing is shortened. However, temperature control is difficult so that the printing surface of the printing plate may be overheated, burning the labels or causing unclear printing.

BRIEF SUMMARY OF THE INVENTION

In accordance with the present invention, there is provided a temperature control system for a thermal printer wherein, in an initial heating period, a high voltage is applied to a printing plate to quickly raise the temperature thereof. Application of the high voltage is interrupted when a predetermined temperature close to an optimal printing temperature is detected by a first sensor. A low voltage controlled by a second sensor and a control circuit connected thereto is then applied to the printing plate so as to maintain the printing plate at the optimal printing temperature.

It is, therefore, the principal object of the present invention to eliminate the aforesaid problems of prior art thermal printers.

Another object of the present invention is to provide an improved temperature control system for a thermal printer, which allows temperature of the printing plate to rise to a preset temperature within a short period of time so as to allow almost immediate printing.

Still another object of the present invention is to provide an improved temperature control system for a thermal printer, which maintains the printing plate at or close to a predetermined temperature so that clear printing may be performed at any time, and power consumption is limited.

Still another object of the present invention is to provide a temperature control system for a thermal printer, which is of simplified construction, is easy to manufacture and will be free of problems over a long period of operation.

BRIEF DESCRIPTION OF THE DRAWINGS

The foregoing and other objects of the present invention will become more apparent from the following description of a preferred embodiment taken in connection with the accompanying drawings, in which:

FIG. 2 illustrates timing charts or curves for explaining the mode of operation of the circuit shown in FIG. 1.

DETAILED DESCRIPTION OF THE PREFERRED EMBODIMENT

Figure 1:
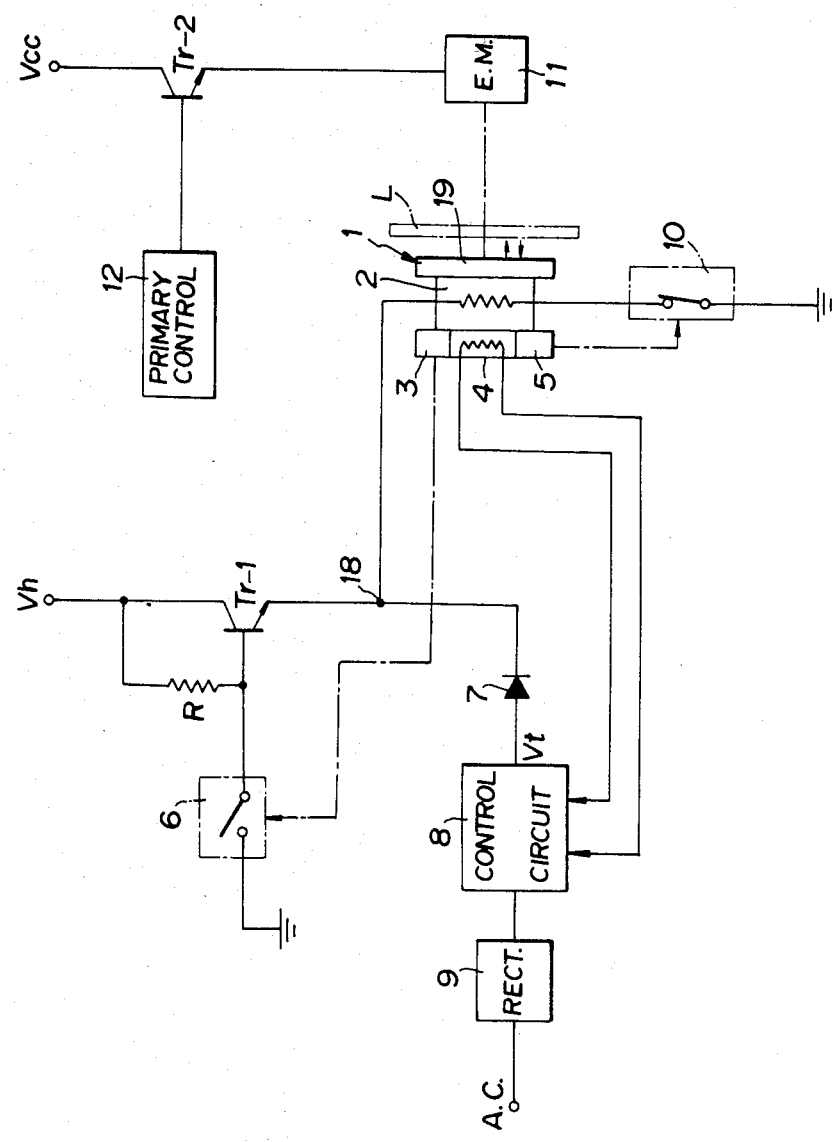
FIG. 1 is a circuit diagram of a temperature control system constructed in accordance with teachings of the present invention.

The present invention will now be described with reference to the accompanying drawings. In the circuit diagram of FIG. 1 printing plate 1 is mounted to electric heater 2. Type (not shown) for printing fixed information such as store names, registered marks and so on which is conventionally printed on labels in advance are formed on printing surface 19 of the printing plate 1 which confronts label L. Three temperature sensors 3, 4 and 5 are shown mounted on heater 2. These sensors 3, 4, 5 may alternatively be directly mounted directly on printing plate 1.

One end of the heater 2 is connected to a power supply of a relatively high voltage Vh through node 18 and the emitter-collector power circuit of transistor Tr-1. The base or control electrode of transistor Tr-1 is grounded through the contacts of relay 6 which is controlled by the first sensor 3. Resistor R is connected in parallel with the base collector circuit of transistor Tr-1.

Node 18 is also connected through diode 7 to control circuit 8. The latter is energized by an A.C. source connected through rectifier 9 to produce relatively low voltage output Vt that is applied through diode 7 to heater 2. The output of second sensor 4 is fed to the control input of control circuit 8 and determines the magnitude of low voltage Vt.

The end of heater 2 remote from node 18 is grounded through the contacts of relay 10. Operation of the latter is controlled by the output of third sensor 5.

Electromagnet 11 is connected to power supply Vcc through the emitter-collector power circuit of transistor Tr-2. In response to a command from printing control circuit 12, magnet 11 urges printing plate 1 against label L for printing information thereon.

Operation of the circuit of FIG. 1 will now be described. When the cold system is turned on, heater 2 is energized by high voltage Vh. First sensor 3 detects a rise in temperature T-1 (FIG. 2) of printing plate 1 to a temperature close to an optimal printing temperature T-2 for printing plate 1, preferably to temperature T-1 slightly lower than the optimal printing temperature T-2. When first sensor 3 detects that temperature T has reached T-1, first sensor 3 supplies a detection signal to relay 6 to turn it on, thereby grounding the base of Tr-1 to block its power circuit. Second sensor 4 detects a subsequent deviation of the temperature T from the optimal printing temperature T-2, and supplies a detection signal to control circuit 8 so as to regulate the magnitude of output voltage Vt therefrom. Typically, second sensor 4 is a thermistor.

Third sensor 5 detects a rise in the temperature T to a temperature T-3 due to defective operation, or the like, of second sensor 4. When plate temperature rises to T-3, third sensor 5 operates relay 10 to open the contact thereof, thereby interrupting the energizing circuit for heater 2. Except when there is a malfunction, output voltage Vt of control circuit 8 is lower than voltage Vh, and the magnitude of voltage Vt varies inversely with the temperature of printing plate 1.

With particular reference to the timing charts shown in FIG. 2, it is seen that when a power supply (not shown) is turned on to energize the system, the power circuit of transistor Tr-1 is turned on connecting high voltage Vh to heater 2, and the temperature T of the printing plate 1 rises rapidly. When plate temperature T reaches temperature T-1 which is slightly lower than the optimal printing temperature T-2, first sensor 3 detects this and produces a signal that closes the contacts of relay 6. This turns transistor Tr-1 off, and heater 2 is energized only by low output voltage Vt from control circuit 8.

Output voltage Vt gradually decreases until temperature T of the printing plate 1 reaches optimal printing temperature T-2. When temperature T reaches optimal printing temperature T-2, output voltage Vt is kept constant to maintain printing plate 1 at optimal printing temperature T-2. Thereafter, any change in the temperature T of printing plate 1 is detected by second sensor 4 and output voltage Vt of control circuit 8 is controlled accordingly so that printing temperature T is maintained at optimal printing temperature T-2.

When temperature T of printing plate 1 reaches optimal printing temperature T-2, magnet 11 is excited in response to a command from the printing control circuit 12. Magnet 11 urges printing plate 1 against label L to perform printing. Instead of using a heat-transfer label, information may be printed on a general label through thermal transfer paper.

In the timing charts of FIG. 2, curve (a) is the temperature T of printing plate 1; curve (b) is the voltage applied to heater 2; curve (c) is the output of control circuit 8; curve (d) is the output of first sensor 3; curve (e) is the voltage at the base of transistor Tr-1; curve (f) is the output of third sensor 5; and curve (g) is the condition of the main circuit for energizing the temperature control circuit of the instant invention.

In the embodiment described above, when the cold system is turned on, power supply voltage Vh as well as output voltage Vt from control circuit 8 are produced. However, it should now be apparent to those skilled in the art that during the initial heating period output voltage Vt need not be produced. Voltage Vh alone may be applied to heater 2. After application of the voltage Vh is interrupted upon operation of relay 6 under the control of first sensor 3, output voltage Vt may be produced from control circuit 8.

In summary, according to the present invention, during the initial heating period, the temperature of the printing plate is raised rapidly by application of a high voltage to a heater. Subsequently, the printing plate is kept at the optimal printing temperature by application of a low voltage. Accordingly, only a short time is required before printing starts. In some situations printing may be performed almost immediately after the power is turned on. After a satisfactory printing temperature is reached, a low voltage is applied so that with ease and reliability, the temperature of the printing plate may be controlled to be optimal. The temperature control system, for a thermal printer, of the present invention permits printing of clear images and has a low power consumption.

Although the present invention has been described in connection with a preferred embodiment thereof, many variations and modifications will now become apparent to those skilled in the art. It is preferred, therefore, that the present invention be limited not by the specific disclosure herein, but only by the appended claims.

What is claimed is:

1. A thermal printer and a temperature control system therefor; said printer including a printing plate, a heater for said plate and means for moving said plate against a heat transfer printing medium; said control system including a relatively high voltage, a control circuit for producing a relatively low voltage related to an input to said control circuit, first means for applying said high voltage to said heater during an initial heating period to rapidly raise the temperature of said plate, first sensor means operatively connected to said first means for interrupting application of said high voltage to said heater when said first sensor means detects that temperature of said plate has reached a predetermined first temperature close to an optimal printing temperature, second means for applying said low voltage to said heater following said initial period, second sensor means for supplying said input to said control circuit in response to temperature of said plate detected by said second sensor means; said control circuit regulating said low voltage to raise the temperature of said plate to said optimal printing temperature and then maintaining temperature of said plate essentially at said optimal printing temperature.

2. A thermal printer and a temperature control system therefor as in claim 1 in which there is an inverse relationship between the temperature detected by the second sensor means and the magnitude of the low voltage.

3. A thermal printer and a temperature control system therefor as in claim 1 also including third sensor means and third means for deenergizing the heater responsive to said third sensor means detecting that temperature of the printing plate has reached a predetermined temperature above said optimal printing temperature.

4. A thermal printer and a temperature control system therefor as in claim 3 in which there is an inverse relationship between the temperature detected by the second sensor means and the magnitude of the low voltage.

* * * * *